(12) United States Patent
Nakata

(10) Patent No.: US 7,092,115 B1
(45) Date of Patent: Aug. 15, 2006

(54) DATA PROCESSING METHOD, DATA PROCESSING APPARATUS AND IMAGE PRINTING APPARATUS

(75) Inventor: Kazuhiro Nakata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/363,823

(22) Filed: Jul. 30, 1999

(30) Foreign Application Priority Data

Aug. 3, 1998 (JP) .............................. 10-219477

(51) Int. Cl.
*G06F 15/00* (2006.01)

(52) U.S. Cl. ...................................... 358/1.16

(58) Field of Classification Search ................ 358/468, 358/296, 1.15, 298, 460, 1.16; 347/13, 237, 347/240, 184; 400/61
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,608,577 A | 8/1986 | Hori | 346/140 R |
| 4,723,129 A | 2/1988 | Endo et al. | 346/1.1 |
| 4,740,796 A | 4/1988 | Endo et al. | 346/1.1 |
| 5,084,831 A | 1/1992 | Morikawa et al. | 395/116 |
| 5,222,818 A * | 6/1993 | Akiyama et al. | 400/61 |
| 5,570,464 A | 10/1996 | Fuse | 395/105 |
| 5,768,484 A * | 6/1998 | Arai et al. | 358/1.16 |
| 5,838,888 A * | 11/1998 | Oda | 358/1.16 |
| 5,927,871 A * | 7/1999 | Nakata | 400/61 |

FOREIGN PATENT DOCUMENTS

| | | |
|---|---|---|
| JP | 54-56847 | 5/1979 |
| JP | 55-132259 | 10/1980 |
| JP | 59-123670 | 7/1984 |
| JP | 59-138461 | 8/1984 |
| JP | 60-71260 | 4/1985 |

* cited by examiner

*Primary Examiner*—Twyler Lamb
*Assistant Examiner*—Alan Rahimi
(74) *Attorney, Agent, or Firm*—Fitzpatrick, Cella, Harper & Scinto

(57) ABSTRACT

A method of raising the printing speed of an image printing device when time-division drive is performed, utilizes time-division drive using four times divisions. Image data is read out of the editing buffer of a RAM in regular order, in the form of a staircase, four dots at a time, and the image data is rearranged in the form of a staircase of eight dots in a print buffer within the same RAM. This makes it possible to transmit data from the RAM to a printhead one byte at a time in an efficient manner.

9 Claims, 11 Drawing Sheets

L : 1/360 OF AN INCH
L : 1/360 OF AN INCH
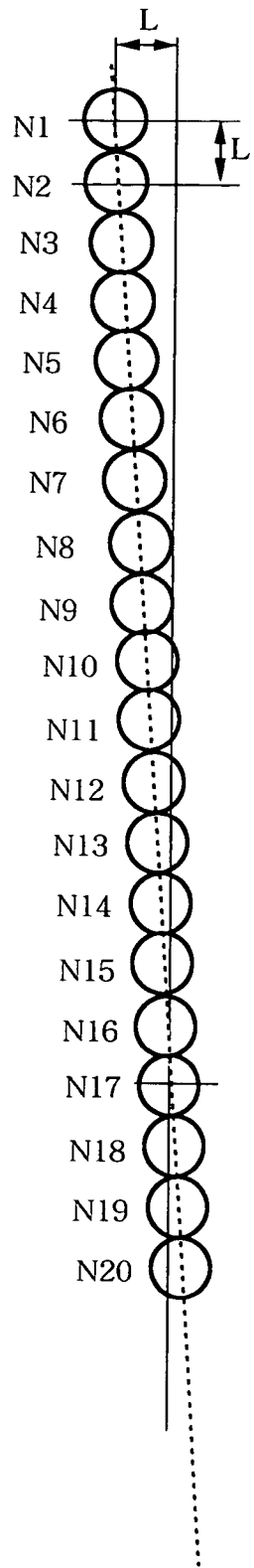
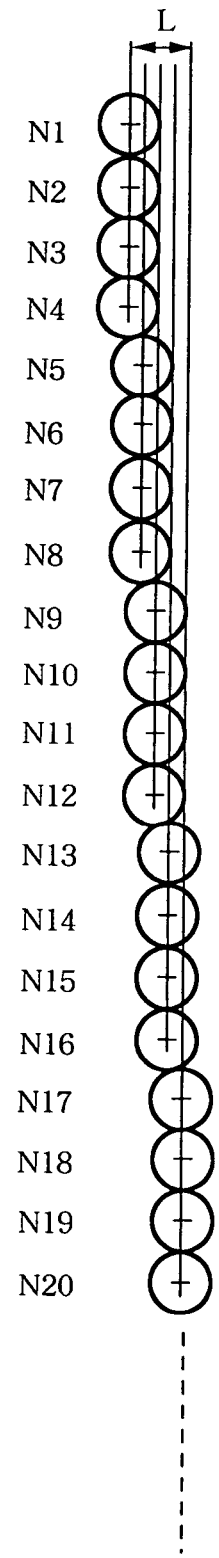
F I G. 3A    F I G. 3B

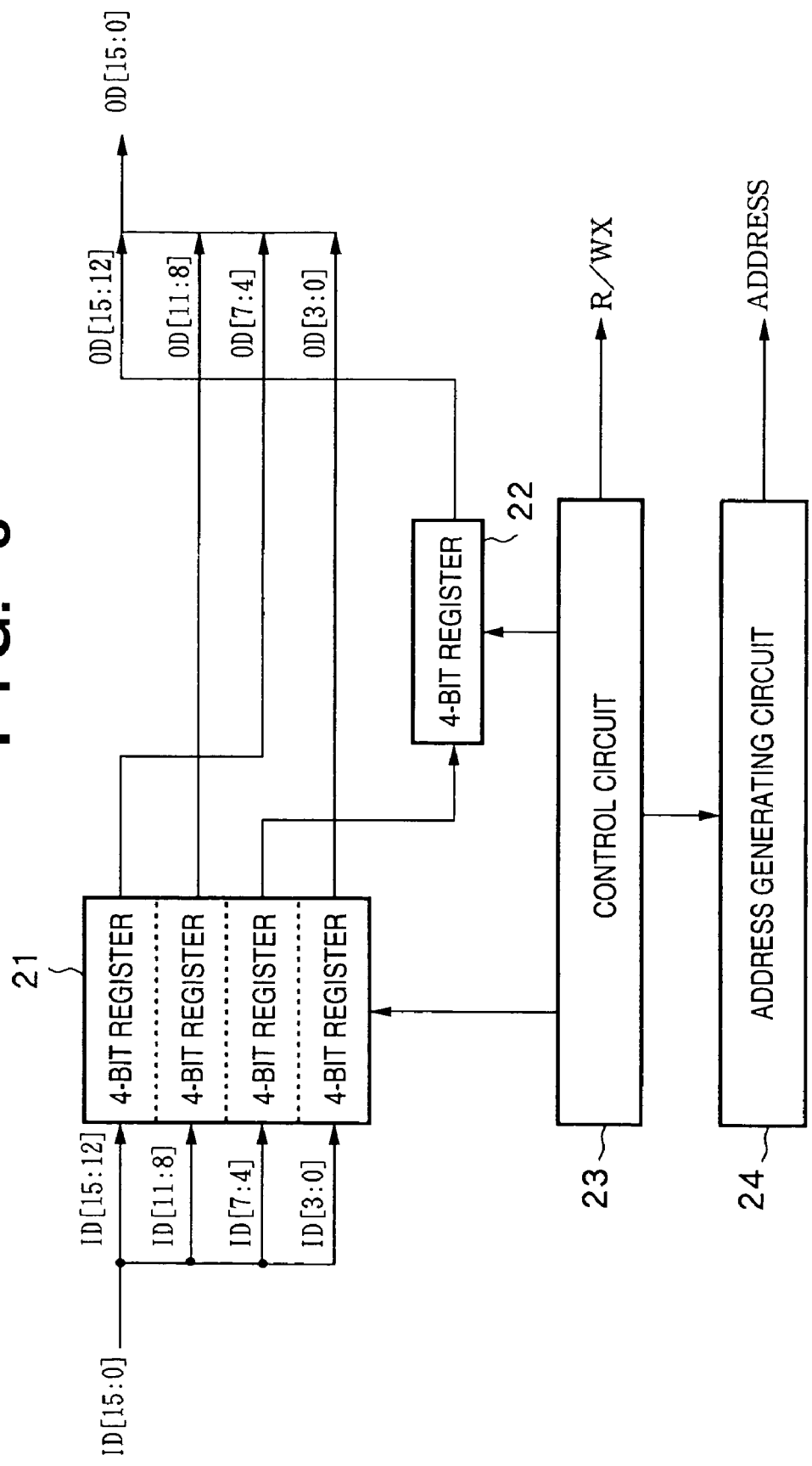

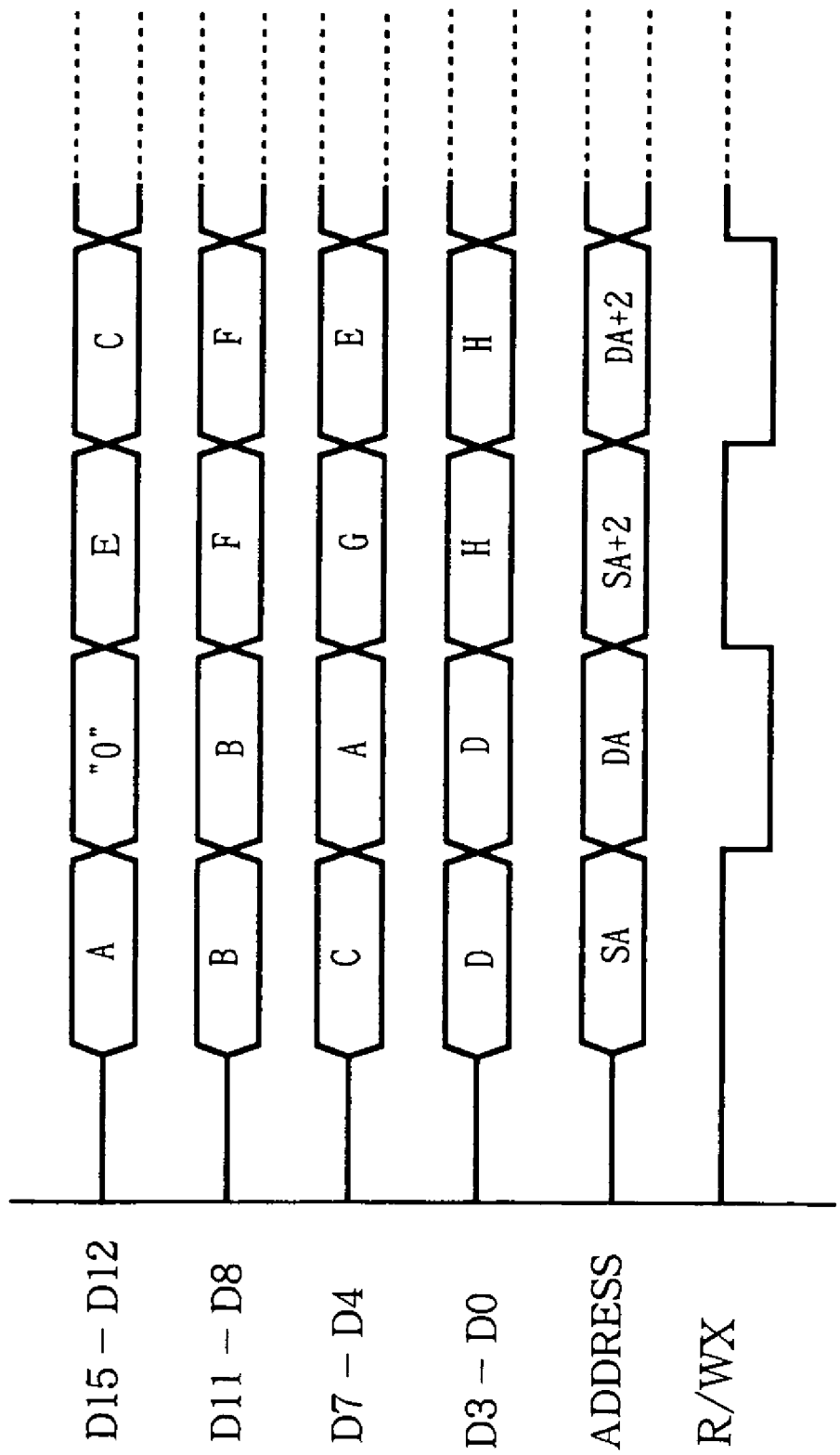

TRANSFER-SOURCE DATA

| ADDRESS | DATA | | |
|---|---|---|---|
| SA | D15 | R1 | D0 |
| SA+H | D15 | R2 | D0 |
| SA+2H | D15 | R3 | D0 |
| SA+3H | D15 | R4 | D0 |
| SA+4H | D15 | R5 | D0 |
| SA+5H | D15 | R6 | D0 |
| SA+6H | D15 | R7 | D0 |
| SA+7H | D15 | R8 | D0 |

FIG. 9A

TRANSFER-DESTINATION DATA

| ADDRESS | DA / DA+1 | DA+2 / DA+3 | DA+4 / DA+5 | DA+6 / DA+7 | DA+8 / DA+9 | DA+10 / DA+11 | DA+12 / DA+13 | DA+14 / DA+15 |
|---|---|---|---|---|---|---|---|---|
| | D15 : D7 | D15 : D7 | D15 : D7 | D15 : D7 | D15 : D7 | D15 : D7 | D15 : D7 | D15 : D7 |
| DATA | C1 | C2 | C3 | C4 | C5 | C6 | C7 | C8 |
| | D8 : D0 | D8 : D0 | D8 : D0 | D8 : D0 | D8 : D0 | D8 : D0 | D8 : D0 | D8 : D0 |

FIG. 9B

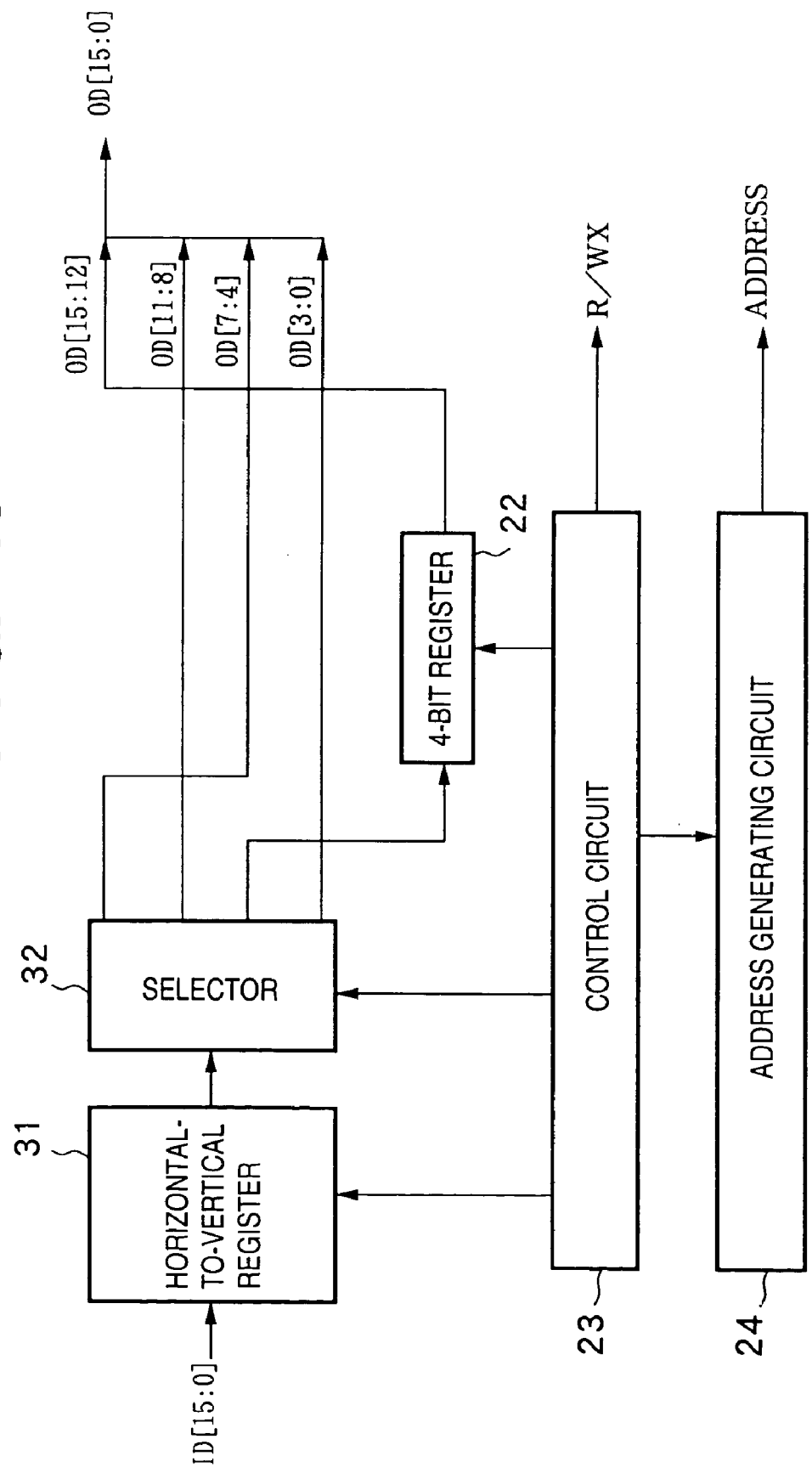

DATA PROCESSING METHOD, DATA PROCESSING APPARATUS AND IMAGE PRINTING APPARATUS

BACKGROUND OF THE INVENTION

This invention relates to a method of processing data that has been stored in a storage device, a data processing apparatus used upon being connected to a storage device, and an image printing apparatus in which such a data processing apparatus is built-in.

Serial printers are in wide use as printers that can be constructed in small size and at low cost. Among the serial printers, ink-jet printers, in particular, have undergone remarkable development in recent years as printers capable of printing quietly and at high speed, and the capabilities of these printers have been enhanced. For example, in regard to printing speed, higher speed has been achieved by raising the scanning speed of the carriage that carries the printhead. Meanwhile, printing quality has been improved greatly by techniques such as raising the definition of images by improving image resolution.

However, there is increasing demand to achieve even higher printing speed and printing quality at the same time, and this has led to certain problems that need to be solved.

For example, a well-known technique for improving printing quality through higher resolution is to drive the nozzles of the printhead in time-division fashion. Specifically, the load on the power supply is alleviated by reducing the peak value of current needed to drive the printhead. In addition, by driving adjacent nozzles at different timings, vibration of the ink, within the printhead that accompanies jetting of the ink drops, is reduced, thereby improving the ink jetting characteristic of the printhead. When printing is performed utilizing this technique, there are instances where attainment of higher printing speed is hampered because data processing takes too much time.

This problem will be described taking as an example an ink-jet printer which prints at 1440 dpi (in the horizontal direction). The printer has a ink-jet head on which 128 ink-jet nozzles are arrayed vertically at intervals of $1/360$ of an inch. Ink drops are jetted from the nozzles toward print paper while the ink-jet head is scanned horizontally relative to the print paper, thereby performing printing on the print paper.

FIG. 2 is a timing chart representing the driving sequence of the printhead. Since time-division drive is performed based upon division by 4, the 128 nozzles of the printhead are driven at four timings. Adjacent nozzles are driven at different timings, and nozzles driven simultaneously are those of every other four dots.

Since the serial printer drives the print head while causing it to travel along the print paper, any deviation in drive timing results in a deviation in the position of dots on the print paper. With the driving method shown in FIG. 2, the rows of dots are formed in the shape of a sawtooth because of the time difference resulting from time division. Therefore, in a case where a printhead is driven by time division, measurements need to be taken so that print deviation will not be caused by a time difference in drive timing.

An example of a method of preventing print deviation involves arraying the nozzles obliquely, relative to the direction of transport, at an angle that corresponds to the printing deviation.

FIG. 3A illustrates the 1st through 20th nozzles arrayed at an angle on the upper end of the printhead. Since the nozzles are thus arrayed, the printhead itself is mounted on the carriage at an incline of 3.58° with respect to a vertical line on the print paper. In other words, the printhead has an incline of $1/360$ of an inch in the horizontal direction per 16 nozzles in the vertical direction. The carriage is scanned horizontally (to the right in FIG. 3A) relative to the print paper.

FIG. 3B is a diagram showing a dot array formed on print paper by the driving sequence of FIG. 2 under these conditions. Since a deviation in drive timing resulting from time-division drive is canceled out by the inclination of the printhead, the dots that correspond to the 1st to 4th nozzles are arranged vertically. Further, the dots that correspond to the 5th to 8th nozzles are arranged vertically and spaced $1/1440$ of an inch to the right of the above-mentioned dots. Because this ink-jet printer prints at 1440 dpi, the dots spaced to the right by $1/1440$ of an inch form a row of dots adjacent on the right side. The same holds true for the other nozzles, in which an adjacent row of dots spaced to the right by $1/1440$ of an inch is formed every four nozzles. By driving the printhead one full cycle, therefore, dot rows in the form of a staircase are formed over 32 rows on the print paper.

FIG. 4 is a diagram showing a data array in a print buffer. Since the print buffer stores print data immediately before it is output to the printhead, the buffer is an area provided in a RAM possessed by the printer. The area is capable of storing print data in the vertical direction equivalent to the size (128 dots) of the printhead and in the horizontal direction equivalent to the width of the print paper. Each rectangle bounded by the solid lines in FIG. 4 indicate one byte of print data. The rows of dots printed by driving the printhead one time have the shape of a staircase, as shown in FIG. 3B. Therefore, in a case where the data is transferred to the printhead from the print buffer, it is necessary to read the data out of the print buffer in staircase fashion, as indicated by the shaded portions in FIG. 4.

The problem that arises here is than when data is read from and written to a RAM, inclusive of a print buffer, one byte, i.e., eight bits, is the smallest unit in which reading and writing can take place. Accordingly, in order to read out the four bits from one of the shaded portions in FIG. 4, e.g., data K1, one byte of data that includes K1 must be read out. Consequently, in order to read out 128 bits of data from K1 to K32, it becomes necessary to read out data of twice the number of bits, namely 256 bits of data. Because of the processing for reading out of the excess data, an increase in printing speed is prevented.

SUMMARY OF THE INVENTION

Accordingly, an object of the present invention is to provide a data processing method and apparatus in which it is possible to raise the efficiency with which data is read out of a print buffer at the time of time-division drive, as well as an image printing apparatus capable of printing at high speed and resolution by using this data processing apparatus.

According to the present invention, the foregoing object is attained by providing a data processing method for processing data stored in a print buffer within an image printing apparatus subjected to time-division drive, comprising a step of rearranging the data in such a manner that one word of data corresponding to a plurality of contiguous nozzles provided on a printhead of the image printing apparatus will become one row in the print buffer.

Further, the present invention provides a data processing apparatus for processing data stored in a print buffer within an image printing apparatus subjected to time-division drive, wherein the data is rearranged in such a manner that one word of data corresponding to a plurality of contiguous nozzles provided on a printhead of the image printing apparatus will become one row in the print buffer.

The data processing apparatus comprises first storage means for storing data of a plurality of words, and delay means for delaying an amount of data that corresponds to a whole-number multiple of a number of time divisions employed in time-division drive, the delayed data being from the data that has been read out of the first storage means.

Preferably, storage means for a horizontal-to-vertical conversion is used as the first storage means.

Further, the present invention provides an image printing apparatus subjected to time-division drive in which n represents the number of time divisions and one word is composed of m bits, comprising data processing means for storing contiguous 1-bit data in one row within a print buffer, the data being from data output by driving the apparatus one time and n-bit data corresponding to n-number of contiguous nozzles serving as one unit, where the lowest common multiple of n and m is 1.

Further, the present invention provides an image printing apparatus for processing data in which one word consists of eight bits, comprising: printhead driving means for discharging ink from four contiguous nozzles of a printhead at different timings; a print buffer for outputting image data to the printhead driving means; and data transfer means for transferring data to the print buffer; said data transfer means rearranging sets of 4-bit data, each set of which corresponds to four contiguous nozzles of the printhead, in such a manner that two sets of data are rendered contiguous.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A, 3B are diagrams showing the relationship between an array of nozzles of a printhead and an array of printed dots;

FIG. 5 is a block diagram showing the principal circuit components of a transfer circuit according to the first embodiment of the present invention;

FIG. 6 is a timing chart showing the operation of a transfer circuit according to the first embodiment;

FIGS. 9A, 9B are diagrams showing data arrays in a transverse-to-longitudinal conversion;

FIG. 10 is a block diagram showing the principal circuit components of a transfer circuit according to the second embodiment of the present invention.

DESCRIPTION OF THE PREFERRED EMBODIMENTS

Preferred embodiments of the present invention will now be described in detail with reference to the drawings. Unless it is specifically stated otherwise, the relative placement of components and numerical values such as resolution set forth in the embodiments do not impose a limitation upon the scope of the invention.

First Embodiment

Figure 2:
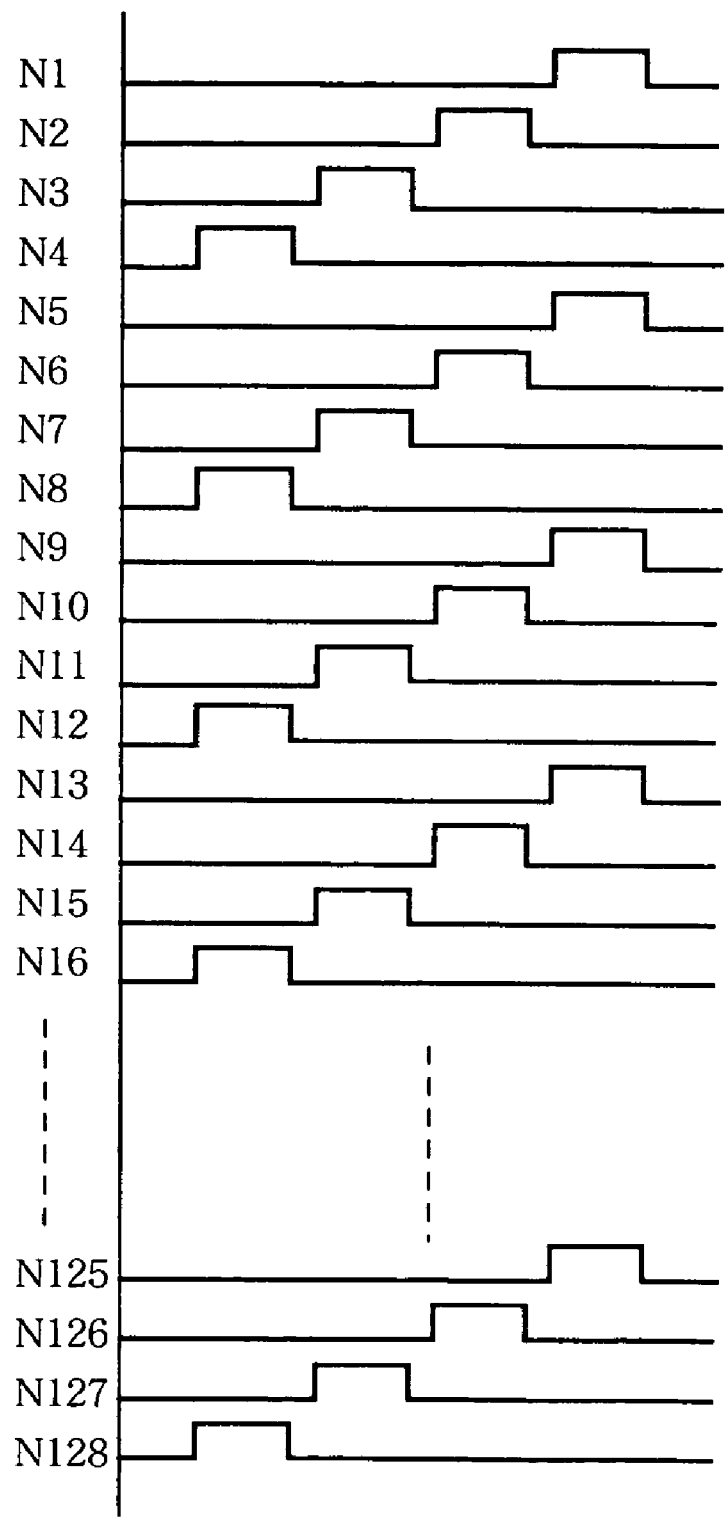
FIG. 2 is a timing chart showing the driving sequence of a printhead.

A printer serving as a first embodiment of an image printing apparatus according to the present invention will now be described. The printer of this embodiment is one which drives a printhead in accordance with the sequence illustrated in the timechart of FIG. 2, and the printhead is arranged as shown in FIG. 3(A) and forms dots in an array of the kind shown in FIG. 3B by a single driving cycle of the printhead.

Figure 1:
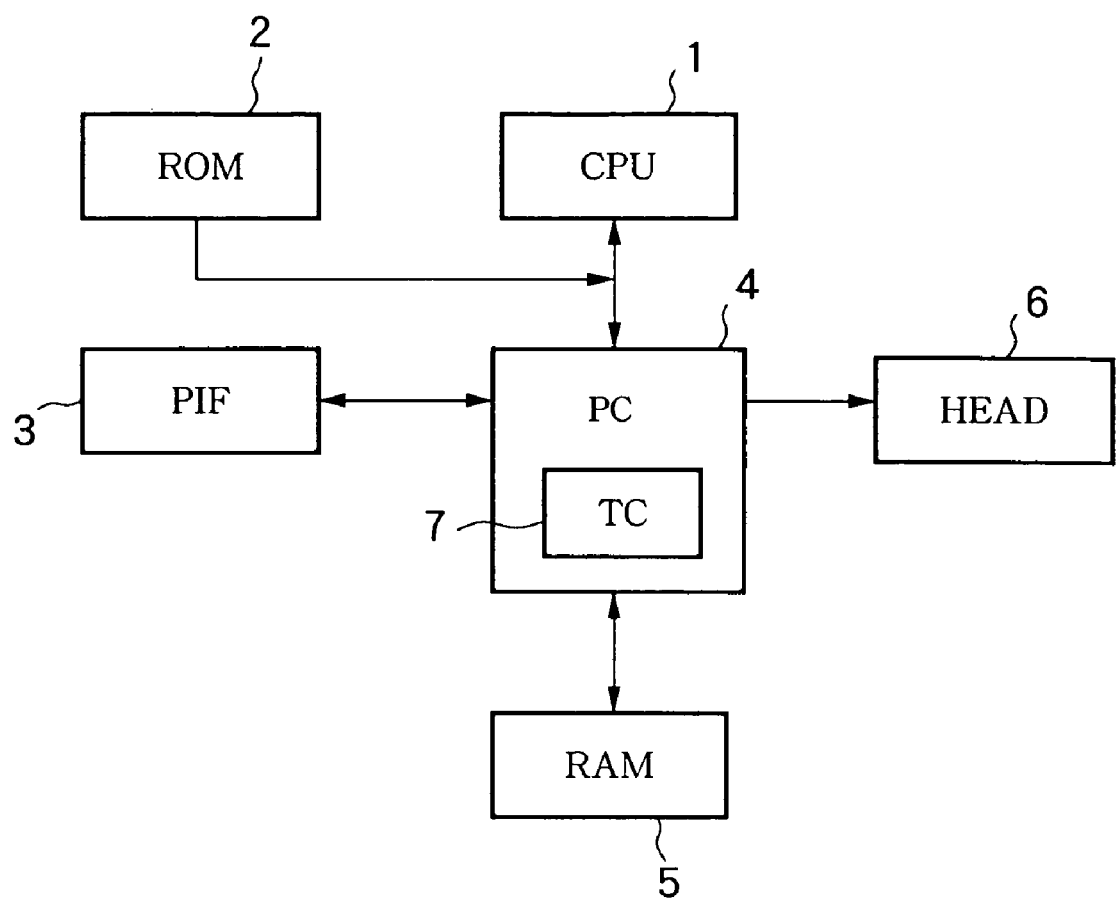
FIG. 1 is a block diagram showing the principal circuit components of a printer according to a first embodiment of the present invention.

FIG. 1 is a block diagram showing the principal circuit components of a circuit for controlling the printer according to the first embodiment of the present invention. The arrangement of FIG. 1 includes a CPU 1, a ROM 2, a parallel interface (PIF) 3, a printer control integrated circuit (PC) 4, a RAM 5 and a printhead 6. The printer control IC 4 has a transfer circuit (TC) 7.

The CPU 1, which controls the overall operation of the printer, incorporates a timer function and input/output ports in addition to a processor section for executing programs. The ROM 2 stores programs executed by the CPU 1 and various data necessary for control. The parallel interface 3, which is connected to a host system such as a computer, receives print data and commands. The printer control IC 4 controls the parallel interface 3, RAM 5 and printhead 6 based upon commands from the CPU 1. The printer control IC 4 incorporates the transfer circuit 7. The RAM 5 is a dynamic RAM, in which 16 bits is the width of one pass. The RAM 5 is used to store received datan image data and the like. As shown in FIG. 3A, the printhead 6 is an ink-jet printhead on which 128 ink-jet nozzles are arrayed vertically at intervals of 1/360 of an inch. Ink drops are jetted from the nozzles toward print paper while the ink-jet head is scanned horizontally relative to the print paper, thereby performing printing on the print paper.

Data that has been received by the parallel interface 3 is stored temporarily in a receive register within the printer control IC 4 and then is stored in a receive buffer area set up in the RAM 5. The CPU 1 checks to see whether or not data has been stored in the receive buffer and, if received data has been stored in the receive buffer, analyzes the received data. Image data that was created by expanding compressed data is stored by the CPU 1 in an editing buffer area set up in the RAM 5. The transfer circuit 7 transfers the data in the editing buffer to a print buffer set up in the RAM 5.

FIG. 5 is a block diagram showing the principal components of the transfer circuit 7. The transfer circuit 7 includes a 16-bit register 21, a 4-bit register 22, a transfer control circuit 23 and an address generating circuit 24. The 16-bit register 21 is expressed by being divided into 4-bit registers in order to make it easier to comprehend the flow of data.

Sixteen-bit data that has been read out of the editing buffer in RAM 5 passes through the input buffer of the printer control IC 4 and is stored in the 16-bit register 21 as input data signals ID15 to ID0. The stored data is written to the print buffer in RAM 5, through the output buffer of the printer control IC 4, as output data signals OD15 to OD0. At this time data that has been stored in the 4-bit register 22 is output as the output signals OD15 to OD12. Initially all "0"s are stored in the 4-bit register 22.

Of the data output from the 16-bit register 21, data corresponding to ID11 to ID8 is output as OD11 to OD8, data corresponding to ID15 to ID12 is output as OD7 to OD4, and data corresponding to ID3 to ID0 is output as OD3 to OD. When the writing of data to the print buffer is completed, the data corresponding to ID7 to ID4, which is among the data output by the 16-bit register 21, is stored in the 4-bit register 22. The above-described operation is controlled by the transfer control circuit 23. Addresses of the RAM 5 when data is read out and data is written in are generated by the address generating circuit 24.

FIG. 6 illustrates a timing chart for when the transfer circuit 7 transfers data. Here D15 to D0 represent data signals of the RAM 5, and ADDRESS represents an address signal. Further, R/WX represents a read/write signal, in which "1" signifies read-out and "0" signifies write. The R/WX signal is converted to a signal, which is suited to control of the RAM 5, in a DRAM control circuit (not shown) within the printer control IC 4. In FIG. 6, A to H of the data signals are symbols of convenience assigned in 4-bit units to facilitate and understanding of the flow of data.

When transfer starts, the transfer circuit outputs a transfer-origin address SA as an address signal and reads data A to D output of the editing buffer in RAM 5. A data transfer is performed simultaneously to transfer 16 bits, i.e., two bytes, whereas addresses are provided in byte units. Data of an address SA+1, therefore, also is output at the same time. When read-out ends, the transfer circuit outputs a transfer-destination address DA as an address signal and writes the data to the print buffer in RAM 5. When a write operation is performed, data is written also to the address DA+1 simultaneously in a manner similar to that of read-out. At the time of the write operation, the "0" that was initially stored in the 4-bit register 22 is written as data D15 to D12. When writing ends, data is then read out of transfer-origin address SA+2 and data is written to transfer-destination address DA+2. At this time data C, which was read out at the time of the immediately preceding transfer and stored in the 4-bit register 22, is written as data D15 to D12. Thereafter, and in similar fashion, data transfer is performed a prescribed number of times. In other words, data transfer commensurate with the width of the paper is carried out.

Figure 7A:
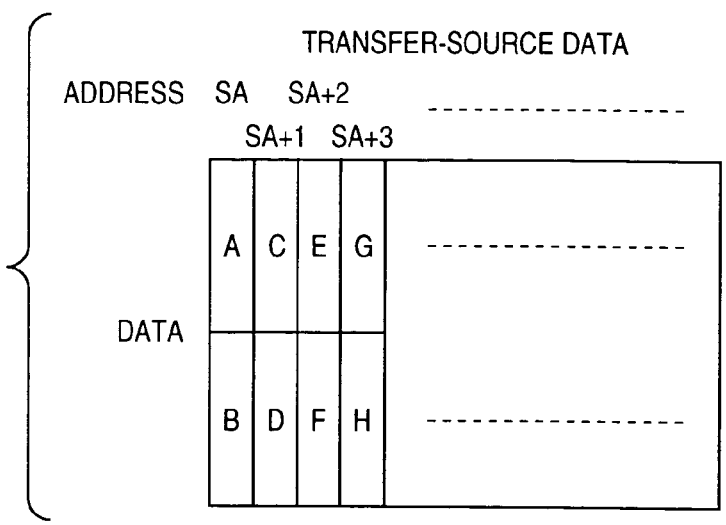
FIGS. 7A to 7C are diagrams showing data arrays at a transfer source and transfer destination in the first embodiment.
Figure 7B:
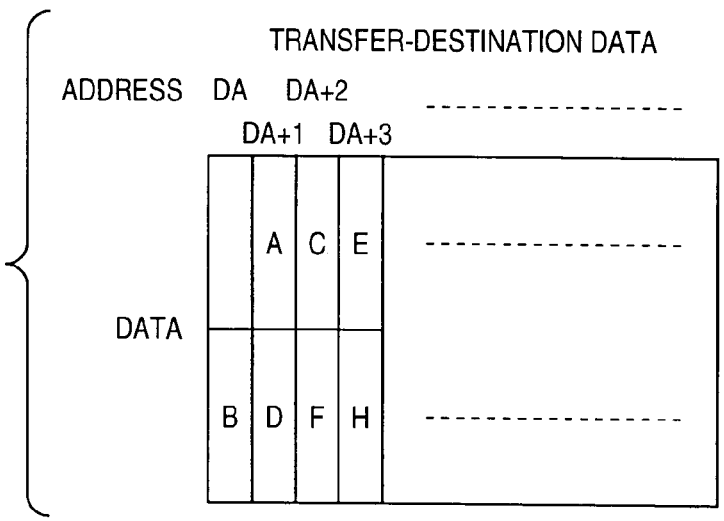
Figure 7C:
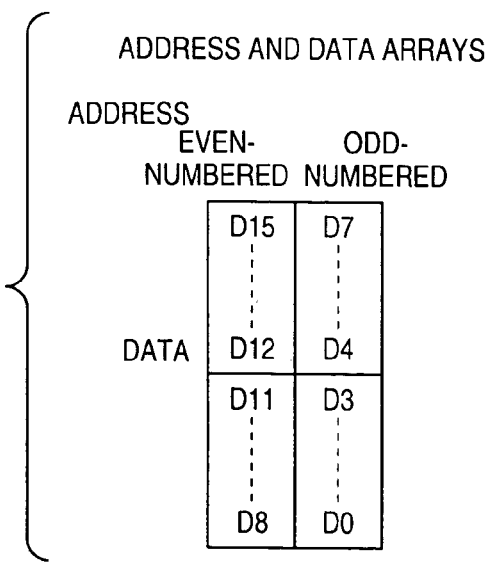

FIG. 7A illustrates a data array in the editing buffer of the transfer origin, FIG. 7B a data array in the print buffer of the transfer destination, and FIG. 7C the addresses of the respective buffers. One byte of data in the editing buffer signifies eight dots of image data vertically. Data obtained by rendering the eight dots of vertical image data continuous in the horizontal direction by an amount commensurate with the width of the paper makes up the editing buffer. When the data in the editing buffer is transferred to the print buffer by the transfer circuit 7, the upper four dots of data are shifted in their entirety one column to the right of the diagram through the operation described earlier.

Figure 4:
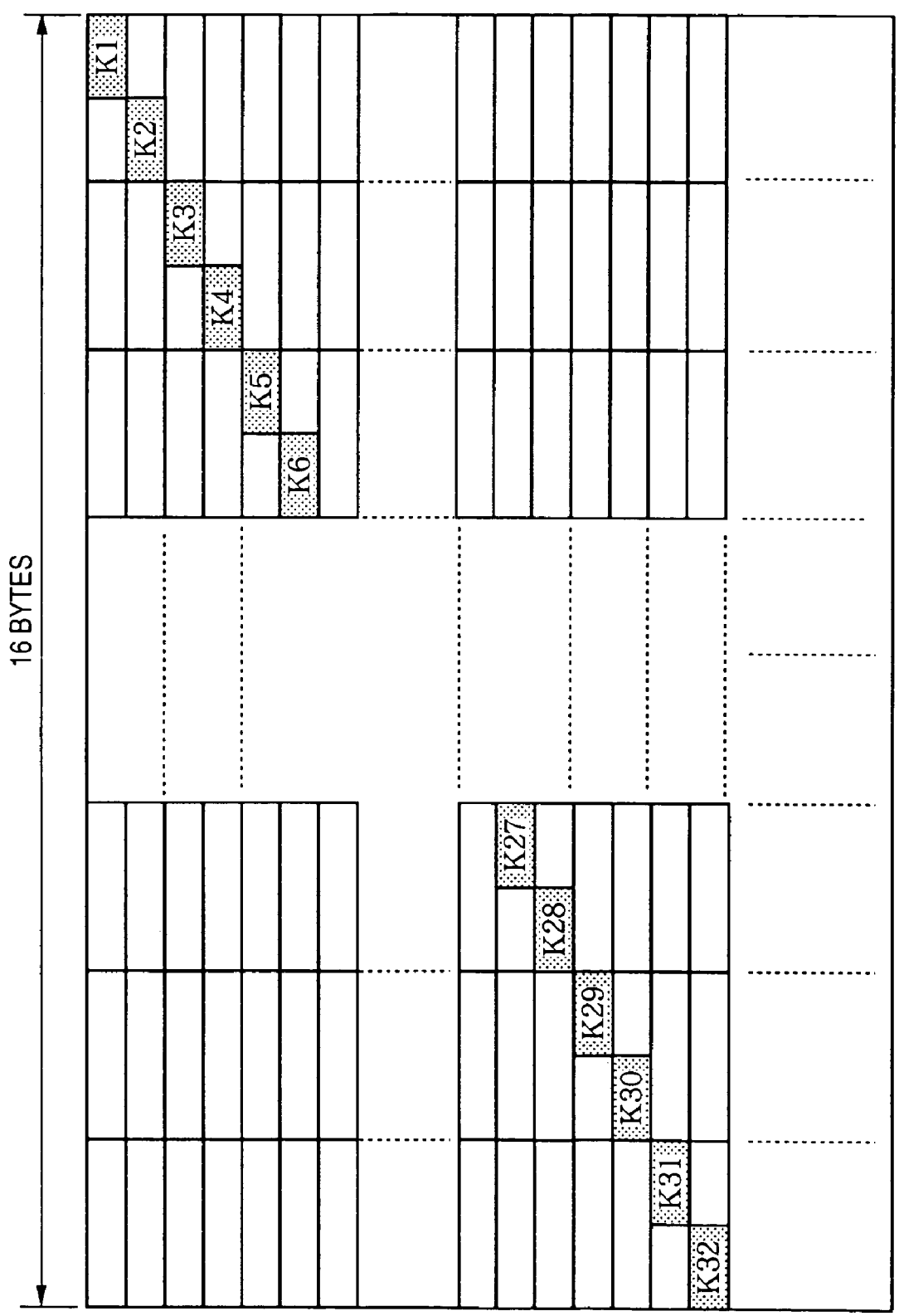
FIG. 4 is a diagram showing the array of data in a print buffer according to an example of the prior art.
Figure 8:
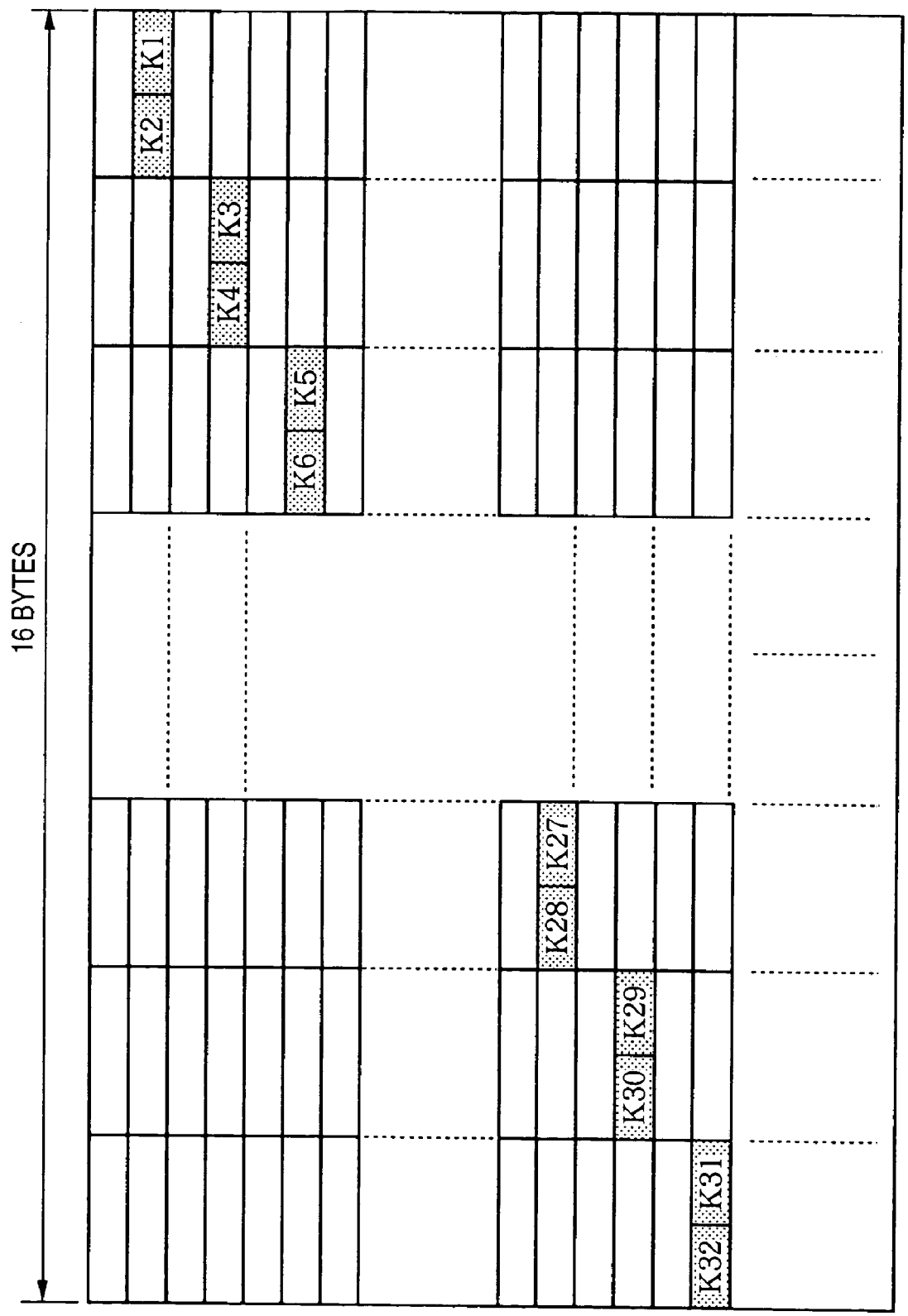
FIG. 8 is a diagram showing an array of data in a print buffer.

Data is output from the editing buffer in the array (see FIG. 4) stored in the conventional print buffer. However, by performing the above-described operation for 128 longitudinal dots, i.e., for 16 bytes, in regard to this output data, the data is stored in the print buffer in an array illustrated in FIG. 8. The shaded portions in FIG. 8 represent print data printed by driving the printhead one time. Of the data indicated by shading in FIG. 8, K1 and K2, for example, form one byte of data, and therefore this data can be read out at one time. In addition, data K3 and K4 and data K5 and K6 can also be read out simultaneously in the same manner. Since only data that takes part in printing is read out when the printhead is driven, reading out 128 bits of data suffices in order to print 128 dots.

Thus, the data is rearranged in such a manner that one word of data corresponding to a plurality of contiguous nozzles provided on the printhead of the image printing apparatus becomes one row in the print buffer. As a result, it becomes possible to read data out of the print buffer more efficiently that in the prior art and printing speed can be increased.

Further, with the construction of the embodiment described above, a register for 20 bits is sufficient and, hence, there is little influence upon the productivity of the apparatus.

Second Embodiment

A second embodiment of the present invention is illustrated in FIGS. 9A, 9B and FIG. 10.

In the first embodiment, an independent data transfer circuit is provided and the arrangement of data is performed between the editing buffer and the print buffer. In the second embodiment, however, data is rearranged by improving a horizontal-to-vertical conversion circuit. The horizontal-to-vertical conversion and the method of improvement will now be described.

In a case where a host computer outputs image data to a printer, often the data is output in a raster format expressed by rows of dots in the horizontal direction. In a serial printer, on the other hand, the printing elements, e.g., ink-jet nozzles, of the printhead are arrayed in the vertical direction. Consequently, it is necessary eventually to process the image data as data arrayed in the vertical direction. In a serial printer, therefore, processing referred to as a horizontal-to-vertical conversion often is executed. More specifically, the method generally employed includes providing a register having N dots in the horizontal direction and M dots in the vertical direction, reading data that is data arrayed in the horizontal direction out of N×M dots of memory, storing the data temporarily in the register and controlling the sequence of data read-out from the register, thereby writing the data to the memory as data arrayed in the vertical direction.

FIGS. 9A, 9B are diagrams useful in describing a horizontal-to-vertical conversion of 16 dots (horizontal direction)×8 dots (vertical direction). Sixteen dots of data at the transfer source shown in FIG. 9A are read out of transfer-source addresses SA and SA+1 as two bytes of data R1 and written to a horizontal-to-vertical conversion register in the printer control IC. Next, R2, which is data one line below R1, is read out of transfer-source addresses SA+H and SA+H+1. Since addresses storing data are contiguous in the horizontal direction in the case of raster data, the addresses of the data of the underlying line are spaced away by H, which corresponds to the width of the print paper. By thenceforth reading out data up to R8 in the same manner, the data of 16 dots (horizontal direction)×8 dots (vertical direction) is stored in the horizontal-to-vertical conversion register. Next, from the data thus stored, data C1, which corresponds to two columns, is written from the left to transfer-destination addresses DA and DA+1 as two bytes of data. By thenceforth writing data up to data C8 in the same manner, the addresses become as shown in FIG. 9B at the transfer destination, thereby completing the horizontal-to-vertical conversion of a block of data consisting of 16 dots (horizontal direction)×8 dots (vertical direction).

FIG. 10 is a block diagram showing the principal components of the transfer circuit improved in order to perform rearrangement of data at the same time as the horizontal-to-vertical conversion.

The transfer circuit shown in FIG. 10 includes a 128-bit [16 dots (horizontal direction)×8 dots (vertical direction)] horizontal-to-vertical conversion register 31, and a selector 32 for extracting data, which has been stored in the horizontal-to-vertical conversion register 31, as data arrayed in the vertical direction. The other functional blocks of this transfer circuit are the same as those of the transfer circuit described earlier in conjunction with FIG. 5.

The operation of the transfer circuit according to this embodiment will now be described with reference to FIG. 11.

Figure 11:
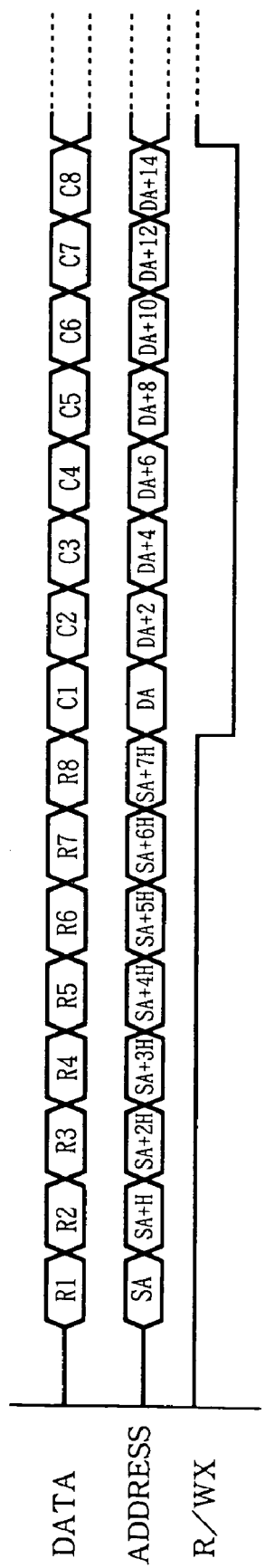
FIG. 11 is a timing chart showing the operation of a transfer circuit according to the second embodiment.

FIG. 11 is a timing chart of the data transfer. Initially, 16-bit data R1 is read out of address SA (and SA+1) in the editing buffer area of the RAM and is stored in the horizontal-to-vertical conversion register 31. By reading out data up to data R8 in a similar manner, data of 16 dots (horizontal direction)×8 dots (vertical direction) is prepared in the horizontal-to-vertical conversion register 31. Next, data C1 corresponding to two rows is selected from the left by the selector 32 and is written as 2-byte data to address DA (and DA+1) in the print buffer area of the RAM. Data is written up to data C8 in similar fashion. At this time the upper four dots of data are shifted in their entirety one column to the right in a manner similar to that of the first embodiment. Furthermore, by continuously applying the horizontal-to-vertical conversion to blocks [data of 16 dots (horizontal direction)×8 dots (vertical direction)] adjacent one after the other on the right side, it is possible to shift the upper four dots of data one column to the right over the entirety of the data commensurate with the width of the paper.

Thus, data that has been prepared in the print buffer can be read out efficiently, as a result of which it is possible to raise printing speed, as described in the first embodiment. Further, in the transfer circuit according to the second embodiment, circuitry required anew to supplement the horizontal-to-vertical conversion function provided in the prior art is merely the 4-bit register, etc. There is almost no risk of a decline in productivity. Furthermore, the rearrangement of data performed in this embodiment is carried out at the same time as the horizontal-to-vertical conversion. As a result, it is unnecessary to transfer data anew and there is no increase in the amount of data processing.

Other Embodiment

In the foregoing embodiments, a case in which data is stored in a print buffer in a data array of the kind shown in FIG. 8 is described. However, the present invention is not limited to the data array of FIG. 8, for it will suffice if the array is such that data corresponding to a plurality of contiguous nozzles is arrayed in one row, with the number of bits being the smallest unit read from and written to the RAM. In the foregoing embodiments, one word is composed of eight bits, and therefore data of eight bits (e.g., K1 and K2) corresponding to eight contiguous nozzles is transferred so as to be arrayed in a single row. However, in a case where one word is composed of 16 bits, it is necessary that data corresponding to 16 contiguous nozzles be transferred so as to be arrayed in a single row.

Further, the number of time divisions used in time-division drive is not limited to four. If one word consists of m bits and the number of time divisions is n, and if the lowest common multiple of n and m is l, data can be read out of the print buffer efficiently if l-bit data is transferred to the print buffer so as to be arranged in a single row.

High-density, high-definition printing can be achieved especially if these embodiments of the invention employ ink-jet printing technology using means (e.g., an electrothermal transducer or laser beam mechanism) for generating thermal energy as the energy utilized to discharge ink, wherein a change in the state of the ink is brought about by this thermal energy.

With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatus. In the case of the on-demand type, at least one drive signal, which provides a sudden temperature rise that exceeds that for film boiling, is applied, in accordance with printing information, to an electrothermal transducer arranged to correspond to a sheet or fluid passageway holding a fluid (ink). As a result, thermal energy is produced in the electrothermal transducer to bring about film boiling on the thermal working surface of the ink-jet head. Accordingly, air bubbles can be formed in the fluid (ink) in one-to-one correspondence with the drive signals. Due to growth and contraction of the air bubbles, the fluid (ink) is jetted via an orifice so as to form at least one droplet. If the drive signal has the form of a pulse, growth and contraction of the air bubbles can be made to take place rapidly and in appropriate fashion. This is preferred since it will be possible to achieve fluid (ink) discharge exhibiting excellent response.

Signals described in the specifications of U.S. Pat. Nos. 4,463,359 and 4,345,262 are suitable as drive pulses having this pulse shape. It should be noted that even better printing can be performed by employing the conditions described in the specification of U.S. Pat. No. 4,313,124, which discloses an invention relating to the rate of increase in the temperature of the above-mentioned thermal working surface.

In addition to the combination of the orifice, fluid passageway and electrothermal transducer (in which the fluid passageway is linear or right-angled) disclosed as the construction of the print head in each of the above-mentioned specifications, an arrangement using the art described in the specifications of U.S. Pat. Nos. 4,558,333 and 4,459,600, which disclose elements disposed in an area in which the thermal working portion is curved, may be employed. Further, it is possible to adopt an arrangement based upon Japanese Patent Application Laid-Open No. 59-123670, which discloses a configuration having a common slot for the ink discharge portions of a plurality of electrothermal transducers, or Japanese Patent Application Laid-Open No. 59-138461, which discloses a configuration having openings made to correspond to the ink discharge portions, wherein the openings absorb pressure waves of thermal energy.

As a print head of the full-line type having a length corresponding to the maximum width of the printing medium capable of being printed on by the printing apparatus, use can be made of an arrangement in which the length is satisfied by a combination of plural print heads of the kind disclosed in the foregoing specifications, or an arrangement in which print heads serve as a single integrally formed print head.

The print head is not limited to one of the cartridge type, in which the print head itself is integrally provided with an ink tank. The print head may be of the replaceable tip-type, in which the electrical connection to the apparatus proper and the supply of ink from the apparatus proper can be achieved by mounting the head on the apparatus proper.

In order to make the printing operation much more stable, it is referred that the printing apparatus described above be additionally provided with print head recovery means and auxiliary means. Specific examples are print head capping means, cleaning means, pressurizing or suction means, preheating means comprising an electrothermal transducer, a heating element separate from this transducer or a combination of the transducer and the heating element, and a pre-discharge mode for performing a discharge of ink separate from a discharge for printing. These expedients are effective in achieving stable printing.

The printing mode of the printing apparatus is not limited to a printing mode solely for the mainstream colors such as black. The apparatus adopted can be one equipped with at least one print head for a plurality of different colors or one full-color print head using mixed colors, through it is desired that this be achieved by a print head having an integrated structure or by a combination of a plurality of print heads.

Further, the foregoing embodiments have been described on the assumption that ink is the fluid. The ink used may be one which solidifies at room temperature or lower, one which softens at room temperature or one which is a liquid at room temperature. In general, temperature control is performed in such a manner that ink viscosity will fall within a stable ink jetting range by adjusting the temperature of the ink itself so as to fall within a temperature range of no less than 30° C. to no greater than 70° C. Accordingly, it will suffice to use an ink liquefied when the printing signal is applied.

In order to positively prevent elevated temperature due to thermal energy by using this as the energy for converting the ink from the solid state to the liquid state, or in order to prevent evaporation of the ink, it is permissible to use an ink which solidifies when left standing but which is liquefied by application of heat. In any case, ink which is liquefied for the first time by thermal energy, such as an ink liquefied by application of thermal energy conforming to a printing signal and jetted as a liquid ink, or ink which has already begun to solidify at the moment it reaches the printing medium, can be applied to the present invention. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

The printing apparatus of the invention may take on the form of an apparatus that is an integral part of or separate from an image output terminal of information processing equipment such as a computer, a copier in combination with a reader or the like, or a facsimile machine having a transmitting/receiving function.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

In accordance with the embodiments described above, it is possible to array print data in a print buffer in a form suited to read-out by implementing a data processing method which shifts only a portion of transfer data to subsequent transfer data. Since data can be read out of the print buffer efficiently, it is possible to raise the printing speed of an image printing apparatus.

Furthermore, in the present invention, a data rearranging function is combined with a horizontal-to-vertical conversion. As a result, it is possible to array print data in a print buffer in a form suited to read-out without inviting a decline in productivity due addition of new circuitry or an increase in amount of data processing due to transfer of data anew.

As many apparently widely different embodiments of the present invention can be made without departing from the spirit and scope thereof, it is to be understood that the invention is not limited to the specific embodiments thereof except as defined in the appended claims.

What is claimed is:

1. An image printing apparatus for processing data in which one word consists of eight bits, comprising:
   printhead driving means for discharging ink from four contiguous nozzles of a printhead at different timings;
   an editing buffer;
   a print buffer for outputting image data to said printhead driving means; and
   a data transfer circuit for reading data from said editing buffer in units of 16-bit data and transferring the data to said print buffer,
   wherein said data transfer circuit comprises:
   a first register adapted to store 16-bit data currently read from said editing buffer;
   a second register adapted to store 4-bit data of 16-bit data previously read from said editing buffer;
   a control unit adapted to control the transfer to said print buffer of 12-bit data of 16-bit data stored in said first register and 4-bit data stored in said second register; and
   an address generating unit adapted to generate an address for the data when said control unit transfers the data.

2. An image printing apparatus subjected to time-division drive, comprising:

an editing buffer and a print buffer for storing image data;

a printhead for performing printing based upon the image data read out of said print buffer; and means for reading image data from two or more address regions within said editing buffer, which will be printed by driving said printhead one time, and packing the image data in numbers of bits serving as units in which data is read from and written to said editing buffer to store the packed image data in one address region within said print buffer, before the image data is transmitted to said printhead.

3. A method of controlling an image printing apparatus subjected to time-division drive and having an editing buffer and a print buffer for storing image data and a printhead for performing printing based upon the image data read out of said print buffer, said method comprising the steps of:

reading image data from two or more address regions within said editing buffer, which will be printed by driving said printhead one time; and packing the image data in numbers of bits serving as units in which data is read from and written to said editing buffer to store the packed image data in one address region within said print buffer, before the image data is transmitted to said printhead.

4. A computer-readable memory storing a control program for controlling an image printing apparatus subjected to time-division drive and having an editing buffer and a print buffer for storing image data and a printhead for performing printing based upon the image data read out of said print buffer, said control program being a program for:

reading image data from two or more address regions within said editing buffer, which will be printed by driving said printhead one time; and packing the image data in numbers of bits serving as units in which data is read from and written to said editing buffer to store the packed image data in one address region within said print buffer before the image data is transmitted to said printhead.

5. A data processing method for processing data in an image printing apparatus subjected to time-division drive of a printhead and having a first storage means and a second storage means, comprising:

a horizontal-to-vertical conversion step of storing data in the first storage means in the horizontal direction and reading data from two or more address regions in the first storage means in the vertical direction;

a rearranging step of rearranging one word of data corresponding to a plurality of contiguous print elements provided on the printhead, which is included in data read from the first storage means in said horizontal-to-vertical conversion step, to store the one word of data in one address region within the second storage means; and a transfer step of transferring the one word of data stored in the one address region within the second storage means to the printhead so as to drive the print elements according to the one word of data.

6. A transfer circuit of an image processing apparatus for transferring data from an editing unit to a print unit, said transfer circuit comprising:

a first register adapted to store 16-bit data;

a second register adapted to store 4-bit data;

a control unit adapted to control the transfer of data from said first register and from said second register to the print unit; and an address generating unit adapted to generate an address for the data when said control unit transfers the data.

7. A method of transferring data in an image processing apparatus from an editing unit to a print unit, said method comprising the following steps:

storing 16-bit data in a first register;

storing 4-bit data in a second register;

controlling the transfer of data from the first register and from the second register to the print unit; and generating an address for the data when the data is transferred in said controlling step, wherein the address includes a transfer-origin identifier and transfer-destination identifier.

8. A transfer circuit of an image processing apparatus for transferring data from an editing unit to a print unit, said transfer circuit comprising:

a conversion register adapted to store data having vertical components;

a selector adapted to extract the vertical-component data from said conversion register;

a register adapted to store data;

a control unit adapted to control said selector and the transfer of data from said register to the print unit; and an address generating unit adapted to generate an address for the data when said control unit transfers the data.

9. The transfer circuit according to claim 6, wherein said first register stores data which is read currently from said editing unit, and said second register stores 4-bit data of 16-bit data which was read previously from said editing unit.

* * * * *